United States Patent [19]

Schreiter et al.

[11] Patent Number: 4,911,497
[45] Date of Patent: Mar. 27, 1990

[54] VENTILATOR ROOF FOR MOTOR VEHICLES

[75] Inventors: Thomas Schreiter, Munich; Arpad Fuerst, Germering; Werner Paetz, Freising, all of Fed. Rep. of Germany

[73] Assignee: Webasto AG Fahrzeugtechnik, Gauting, Fed. Rep. of Germany

[21] Appl. No.: 320,549

[22] Filed: Mar. 8, 1989

[30] Foreign Application Priority Data

Mar. 10, 1988 [DE] Fed. Rep. of Germany ....... 3807961
Dec. 2, 1988 [DE] Fed. Rep. of Germany ....... 3840694

[51] Int. Cl.⁴ .................... B60J 7/053; B60J 7/057; B60J 7/22
[52] U.S. Cl. .................. 296/222; 296/214; 296/217; 296/223; 98/2.14
[58] Field of Search ............. 296/208, 214, 216, 217, 296/220, 222, 223; 98/2.12, 2.14

[56] References Cited

U.S. PATENT DOCUMENTS 4,070,607 1/1977 Mitterer .................. 318/468
4,320,921 3/1982 Schaetzler ................ 296/213
4,630,859 12/1986 Bienert et al. ............. 296/217

FOREIGN PATENT DOCUMENTS 2454723 5/1976 Fed. Rep. of Germany .
8119662 8/1981 Fed. Rep. of Germany .
3149977 6/1983 Fed. Rep. of Germany .
3311452 10/1983 Fed. Rep. of Germany .
3438360 5/1985 Fed. Rep. of Germany ...... 296/222
3725982 2/1989 Fed. Rep. of Germany ...... 296/216

Primary Examiner—Dennis H. Pedder
Attorney, Agent, or Firm—Sixbey, Friedman, Leedom & Ferguson

[57] ABSTRACT

A ventilator roof for use in motor vehicles with a roof opening made in a front part of a fixed roof skin. The roof opening can be closed by a single cover that can be swung, by pivoting around a pivoting axis at or near its rear edge, into a ventilation position in which the cover front edge is at a distance below the fixed roof surface, while the cover rear edge is kept approximately at the height of the fixed roof skin. Starting from the ventilation position, the cover can be lowered at its rear edge below the fixed roof surface and can then be slid as a whole rearwardly under the roof skin into an open position that at least partially opens the roof opening.

37 Claims, 11 Drawing Sheets

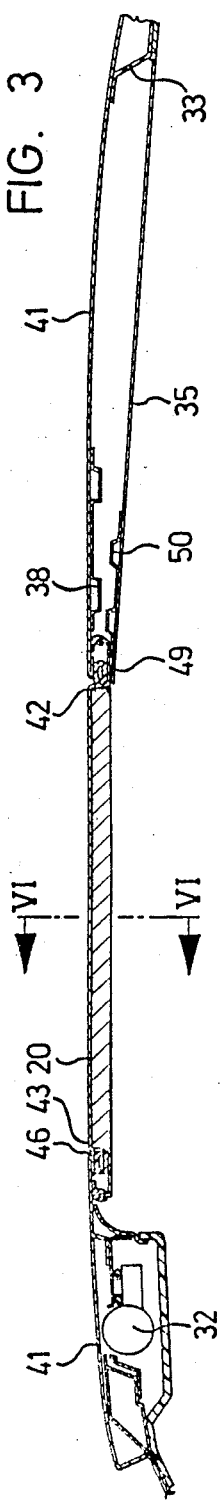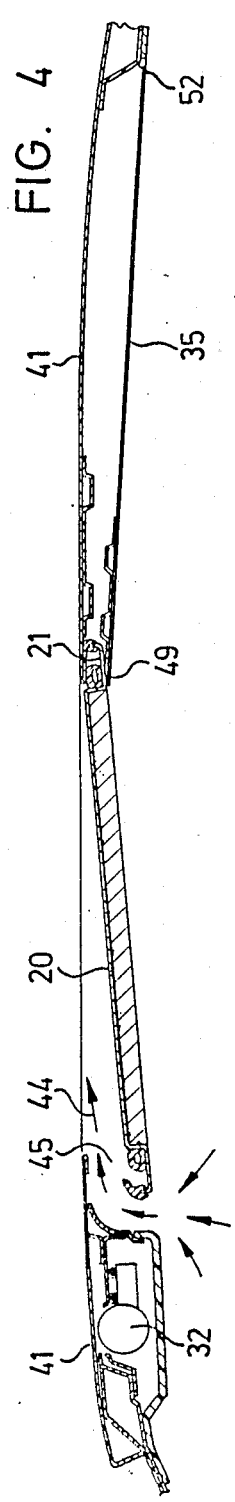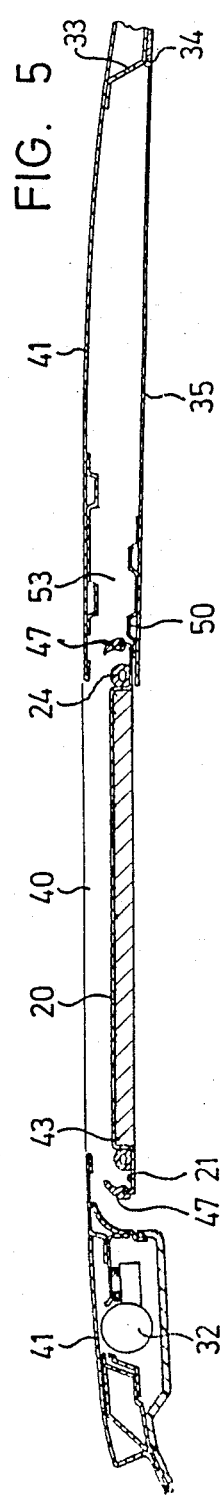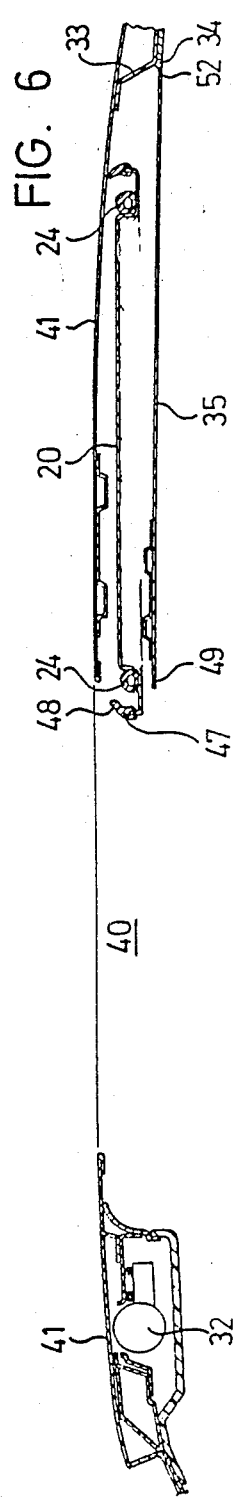

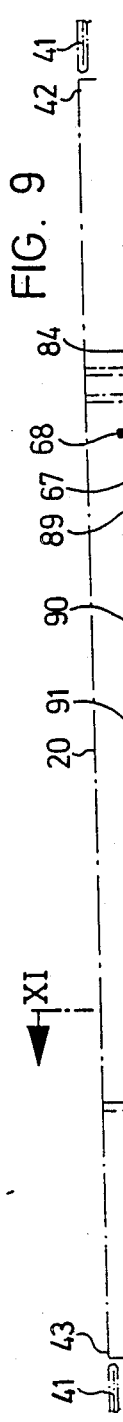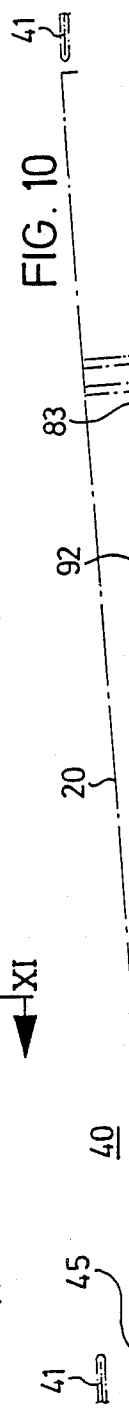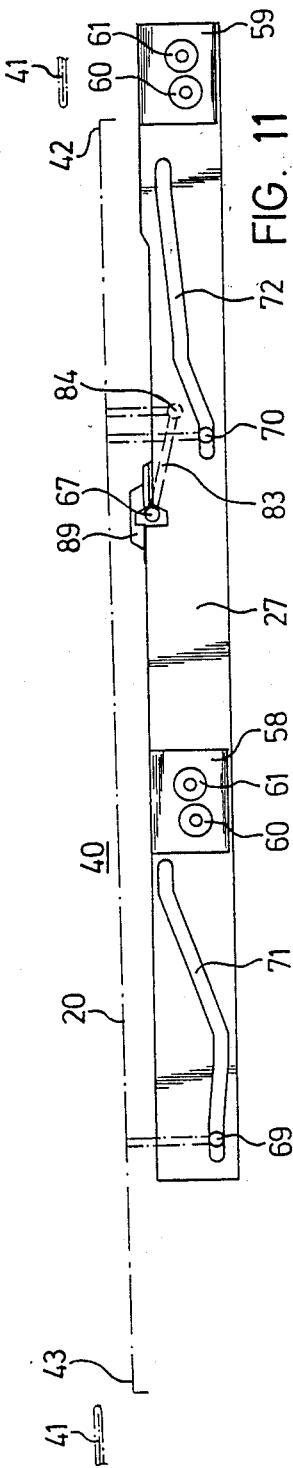

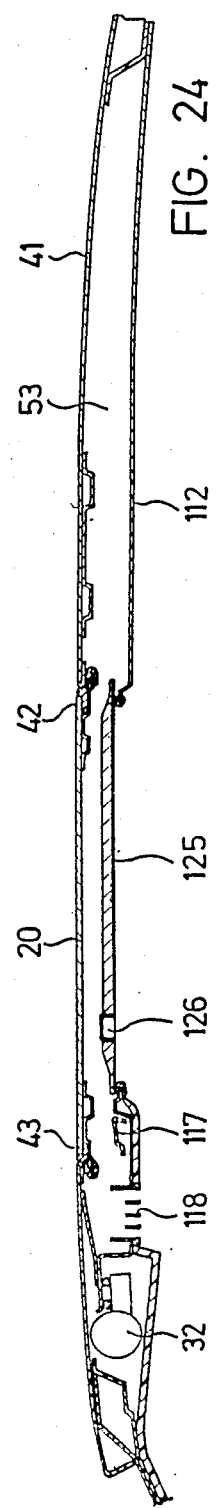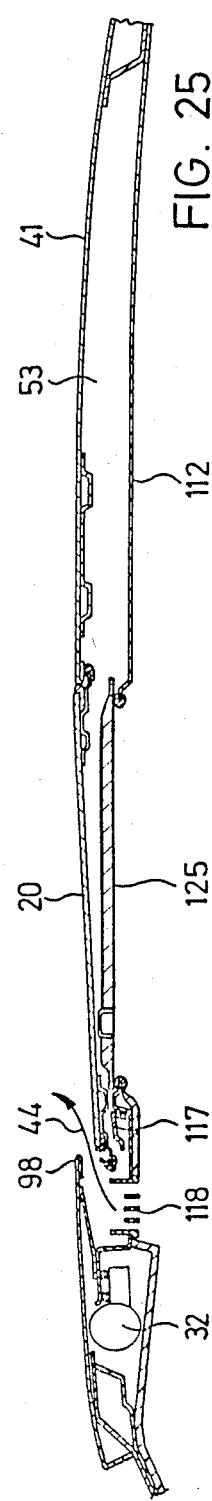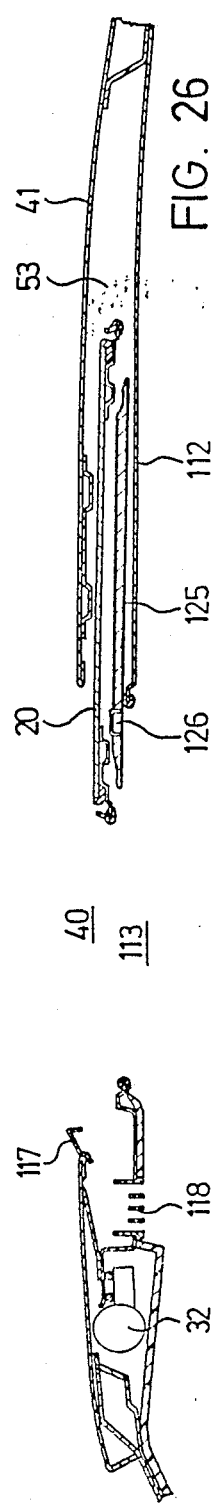

VENTILATOR ROOF FOR MOTOR VEHICLES

BACKGROUND OF THE INVENTION

The invention relates to a ventilator roof for motor vehicles having a roof opening made in a fixed roof surface that can be closed by a single cover which, by pivoting around a pivoting axis at or near its rear edge, can be swung into a ventilation position wherein the cover front edge is at a distance below the fixed roof surface while the cover rear edge is kept at least approximately at the height of the fixed roof surface.

In a known ventilator roof, German Gebrauchsmuster No. 81 19 662, the roof opening is made in the rear part of the fixed roof surface, and the cover can be taken out to open the roof opening. This known ventilator roof does, however, avoid the upward projection of any parts above the fixed roof shell in the ventilation position, which is aerodynamically favorable especially at high speeds. But, the ventilation gap opened at the central part of the roof (in the direction lengthwise relative to vehicle direction), formed after the cover is swung into the ventilation position, leaves something to be desired from a ventilation engineering standpoint. The opening degree of the roof opening cannot be quantitatively regulated. Moreover, even with the cover removed, the driver and passenger do not have a sense of driving in a convertible. These drawbacks can be partially eliminated if, in a likewise known way (German Offenlegungsschrift No. 31 49 977), there is provided in front of a rear cover, that can be swung into a ventilation position, a second cover which, after pivoting the rear cover into the ventilation position, can be pushed rearward over the rear cover to open a part of the roof opening above the driver and passenger. But such a two-cover solution requires an expensive and delicate drive and adjustment mechanism. Further, the roof opening can be opened only to less than half its overall size.

Other conventional sliding-lift roofs have a cover that can be selectively pushed outward or pushed rearward under the fixed roof shell. Such covers, for example, as shown in German Pat. No. 24 54 723 and corresponding U.S. Pat. No. 4,070,607, do make it possible to open the roof opening completely or almost completely, wherein the opening of the roof can be quantitatively regulated. But, in these types of roofs, the cover must be swung up into the ventilation position, thereby negatively affecting the aerodynamic behavior of the vehicle, especially at high speeds. Moreover, the ventilation properties in this case still leave something to be desired. Even more aerodynamically unfavorable are the so-called spoiler roofs, in which the cover, after swinging out into a ventilation position above the fixed roof shell, can be pushed rearward (German Offenlegungsschrift No. 33 11 452).

SUMMARY OF THE INVENTION

It is a primary object of the present invention to provide a ventilation roof of the type initially mentioned that is improved especially from a ventilation engineering viewpoint, while maintaining favorable aerodynamic properties.

This object according to the present invention is achieved by making the roof opening in the front part of the fixed roof shell, wherein a cover, starting from a ventilation position, can be lowered with its rear edge below the surface of the fixed roof and slid as a whole rearward under the roof shell, to thereby provide an open position that opens, at least partially, the roof opening.

In the ventilation roof according to the invention, the ventilation gap is made near the front end of the fixed roof shell, which is advantageous from a ventilation engineering viewpoint for deicing and eliminating deposits on the inside of the windshield. Moreover, a driver and passenger of the vehicle are not bothered by the air current flowing through the ventilation gap of the cover in the ventilation position. Also, the cover can be slid rearwardly so that by sliding the cover, the degree of opening of the roof opening can be quantitatively regulated at any desired position. With the cover fully pushed back, the driver has a sense of driving in a convertible. The present invention is additionally advantageous in that in all of the possible cover positions, almost none of the roof parts project upward above the fixed roof surface, thereby resulting in an aerodynamically favorable driving behavior for the vehicle, especially at high speeds. In contradistinction to a spoiler type roof, the conventional appearance of the vehicle is maintained. Additionally, the use of but a single cover allows this inventive ventilation roof to be sufficiently operated by a relatively simple drive and adjustment mechanism.

Furthermore, the present invention provides that when the rear edge of the cover is lowered and the cover front edge has been previously lowered into the ventilation position, then the cover front edge is preferably raised into an intermediate position between the ventilation position and the closed position, which is favorable especially with respect to headroom.

According to another feature of the invention, the cover carries a fixed drip molding extending all the way around the cover, wherein the fixed drip molding, in the closed cover position, fits under the edge gap between the outside edge of the cover and the edge of the roof opening. In this way, the rear drip molding that is necessary in conventional sliding roofs and is separate from the cover but coupled with its sliding movement, can be eliminated. Preferably, the cover of the present invention is further provided with a seal or sealing surface extending all the way around the cover whose dimensions are larger than the associated dimensions of the roof opening and the cover, for sealing the cover relative to the fixed roof in the closed position. The seal of sealing surface is sufficiently pressed from below vertically against the edge of the roof opening, thus leading to a reliable sealing of the cover with an increasing sealing effect at higher speeds. Moreover, it is thus impossible for the cover to be pulled out by the influence of the airflow. The ventilator roof further advantageously offers greater security against the cover being forced outward, for example, in an accident or in an attempt to break into the vehicle through the roof. Even large tolerances of the outside cover dimensions and/or the inside dimensions of the roof opening or a slight curvature of the cover front edge will prevent proper sealing of the roof. The sealing gap itself can be kept comparatively narrow.

Additionally provided below the fixed roof surface at a portion that borders the roof opening at the rear edge thereof, can be a rigid roof panel that can be lowered, wherein the rigid roof panel preferably is connected to swing by its rear end to a member stationary with the roof and, in the area of its front end, is elastically pretensioned upward so that it abuts against the cover from below in all cover positions. In the closed cover position, such a lowerable rigid roof panel moves upward to thus enlarge the headroom for backseat passengers.

In accordance with a further feature of the invention, the cover is connected to a cover adjustment mechanism, which is provided on both sides of the roof opening below the fixed roof shell. In this way the cover adjustment mechanism does not result in a loss of headroom. The cover adjustment mechanism itself is placed in a protected position. One simple cover adjustment mechanism is achieved by the utilization of a connecting member that sits on both sides of the roof, wherein the connecting members are slidably guided in the vehicle longitudinal direction along guide rails fixedly attached to the roof. The connecting members are connected to the cover in each case by at least one front and one rear cover connecting bolt that engage in connecting member tracks of each connecting member. By suitable design of the connecting member tracks, an actuation path for the ventilation function that is relatively long and thus able to be graduated well can be accommodated. Furthermore, the distance between levels of the lowering paths can be kept small.

In order to facilitate the making of the ventilator roof capable of preassembly, both guide rails, in their front and rear areas, are connected to each other by crossstruts. This way, the front cross-strut can be advantageously configured as a wind deflector, while the lowerable rigid roof panel can be connected to swing to the rear cross-strut, e.g., by hinges. The guide rails may be suitably made of extruded sections, because in this case they would require, at most, only a little mechanical finishing. For actuation of the ventilator roof, a single drive suffices that is operatively connected to each of the connecting members by way of a drive cable, preferably in the form of threaded cable. Guide rollers are pivotally mounted to the connecting members and are guided in guide channels of the associated guide rails, running in the longitudinal vehicle direction, to assure a sturdy and smooth slidable mounting of the connecting members relative to the guide rails.

The connecting member tracks can be designed so that, when the connecting members are pushed rearward from the closed cover position, the cover is first brought into the ventilation position and subsequently into a position with its rear edge lowered to then be carried rearward. But according to a modified embodiment of the invention, also after its front edge is lowered, the cover can be pushed rearward with its front end under a portion of the fixed roof shell in front of the roof opening. In such a case, the connecting member tracks are suitably designed so that the cover, when the connecting members are pushed forward from the closed cover position, is first lowered at front edge thereof and subsequently moved forward, and so that the cover, when the connecting members are pushed rearward from the closed cover position, is lowered at the front and rear edges thereof and subsequently moved rearward.

According to another feature of the present invention, a stopping device is provided that prevents sliding movement between the cover and the guide rails during pivoting of the cover and releases it for sliding rearward only when the cover rear edge is lowered into the position necessary for this sliding movement.

Preferably, lateral shields are provided on both sides of the roof opening to cover the cover adjusting mechanisms and simultaneously form additional drip moldings that reach under the lateral parts of the cover drip molding that extends around the cover and have water drains thereon. On the underside of the cover, an elastic inside cover lining is provided that is solidly connected to the central region of the cover, but projects laterally from the attachment region to resiliently press against lateral lining parts rigid with the roof, such as the lateral shields.

Preferably, in the area of the front edge of the roof opening, a movably mounted front shield is further included that is simultaneously made as an impact protection, wherein the front shield is elastically pretensioned upward and also assumes the function of a wind deflector when the cover is pushed back.

A ventilator roof formed in accordance with the present invention performs advantageously without fixed sheet metal or plastic frames, thereby saving weight and achieving additional headroom. Moreover, the roof opening can be selected to be relatively large and the cover itself can again be kept thin in the interest of headroom. It is also understood that the ventilator roof according to the invention can be a kit and can be largely preassembled as a modular unit. Assembly and elevation adjustment can be performed in one operation. Automatic assembly of the roof is also possible.

In yet another embodiment, an additional fixed headlining member can be provided that engages under the fixed roof shell at least in the area in front of the roof opening. This fixed headlining member extends from the area of the front edge of the roof opening rearward to a point under the front part of the cover in a closed position thereof, and is provided with at least one ventilation grille. With the ventilation grille, the airflow that develops when the cover is in the ventilation position can be purposefully guided so that on the one hand the grille achieves a better ventilation effect, but on the other hand it avoids disruptive wind noises. The gap between the cover front edge and the fixed headlining member or the front edge of the roof opening is also no longer visible from the vehicle interior. Thus, an aesthetically pleasing environment is achieved within the vehicle interior in all cover positions.

Furthermore, in the area of the front edge of the roof opening, a wind deflector can be included that is adjustable, depending on the cover sliding movement, between a resting and a working position. Such a design is preferably made so that the fixed headlining member also engages under the wind deflector. The wind deflector thus remains invisible from the car interior. In the closed cover position, the cover ventilation position, and intermediate positions between these two positions, the wind deflector is protected between the cover and the fixed headlining member. Suitably, the ventilation grille is in the part of the fixed headlining member that engages under the part of the fixed roof located in front of the front edge of the roof opening, and when a wind deflector is present, the ventilation grille is preferably placed in front of it, as well. In this way, any disruptive influence of the ventilation airflow by the wind deflector and/or the front end of the cover, when in the ventilation position, is prevented.

The ventilation grille can also form at least one air circulation duct running essentially vertically or convexly bent forward, wherein the duct advantageously runs parallel to the front edge of the roof opening over a distance that corresponds at least to 75% of the width of the roof opening.

The cover may also consist of transparent or translucent material, thus involving a so-called glass roof, wherein a sliding headlining member is advantageously provided which can be slid under the glass cover starting from a closed position in which it covers an opening of a roof frame lying under the roof opening, rearward into an open position in which it at least partially opens this opening.

The terms "front" and "rear", as used above and hereinafter, refer to the front and rear of a vehicle with reference to the normal forward travel direction of the motor vehicle in which the roof is incorporated.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 3 through 6 are longitudinal cross-sectional views through the ventilator roof at different operative positions of the cover;

FIGS. 9 through 11 are longitudinal cross-sectional views taken through the ventilator roof illustrating the cover adjustment mechanism in different operative positions;

FIGS. 24 through 26 are longitudinal cross sections through the ventilator roof according to FIG. 23 at different operative cover positions;

DETAILED DESCRIPTION OF THE PREFERRED EMBODIMENTS

Figure 1:
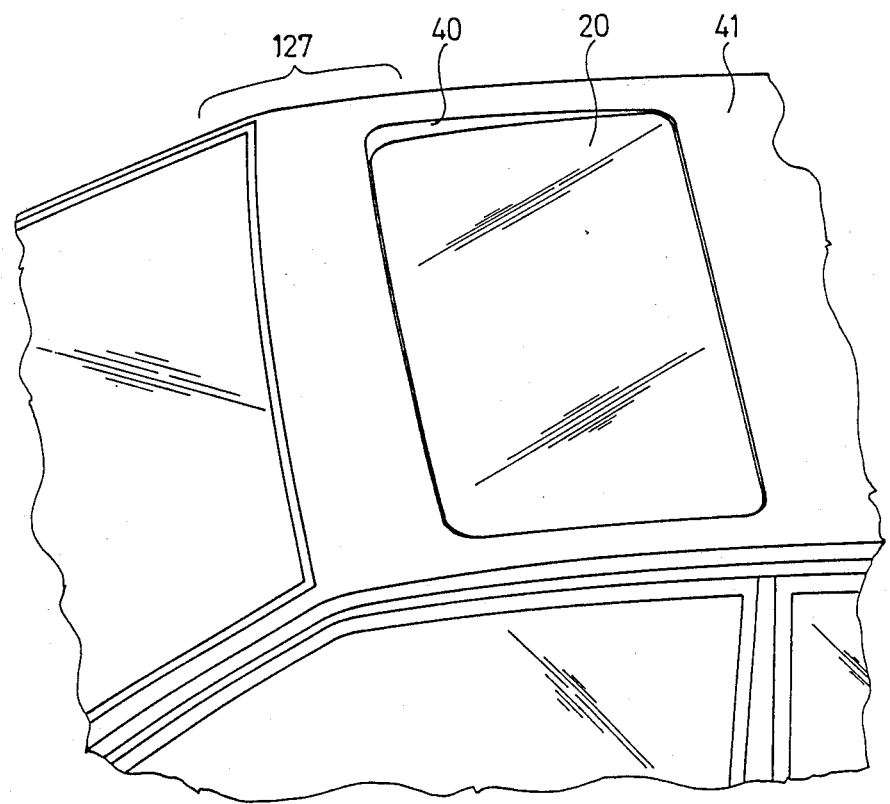
FIG. 1 is a partial perspective top view of a motor vehicle provided with a ventilator roof in accordance with the present invention.
Figure 2:
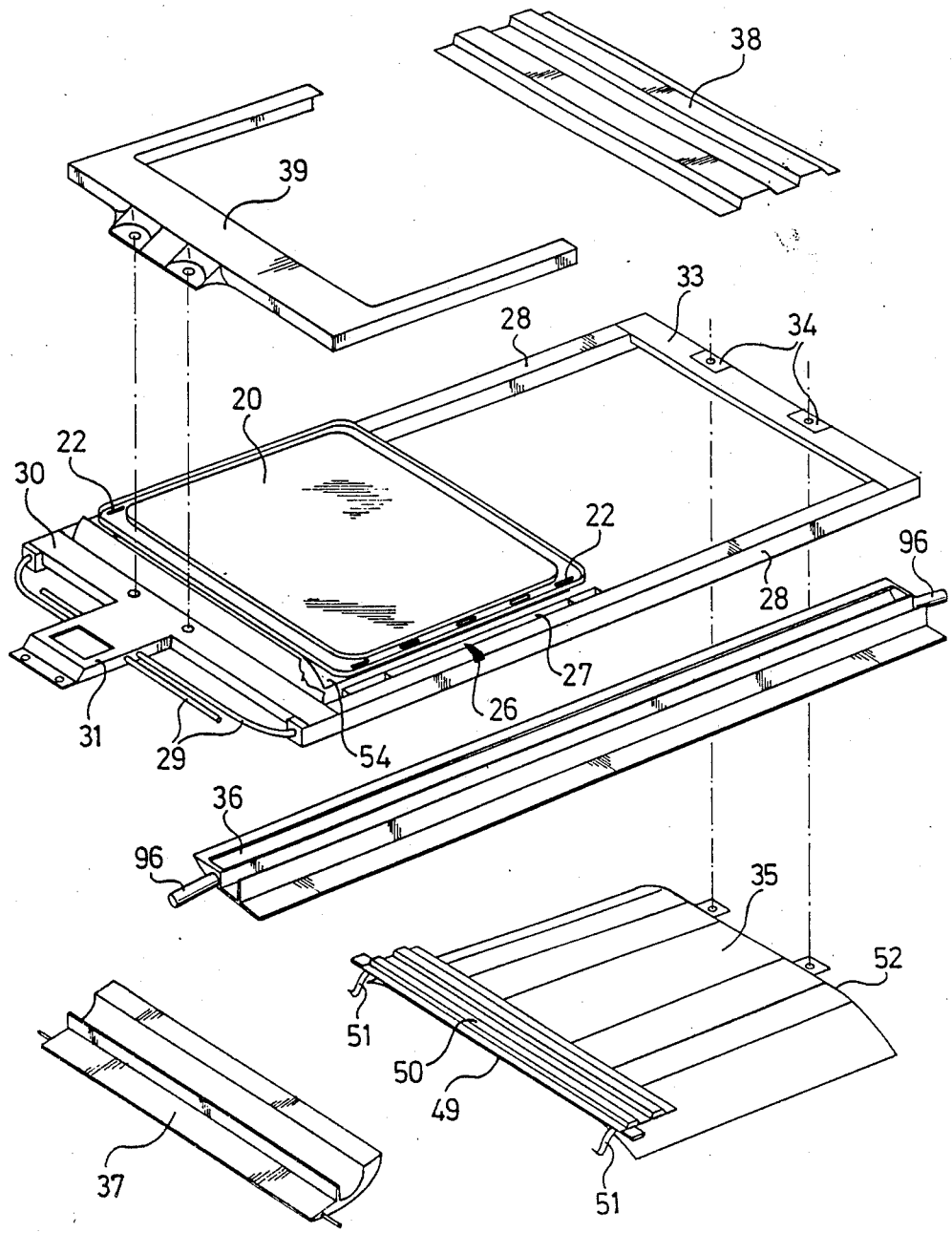
FIG. 2 is an exploded representation, in perspective, of the essential parts and structural components of the ventilator roof of the present invention.
Figure 12:
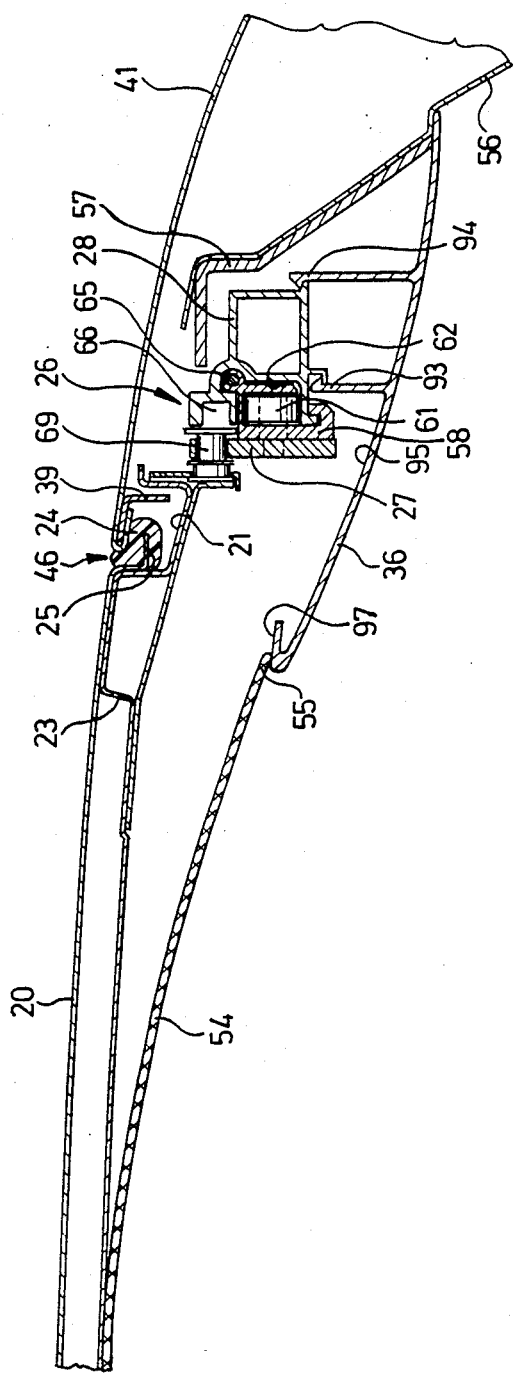
FIG. 12 is a cross-sectional view taken along line XI—XI of FIG. 9.
Figure 14:
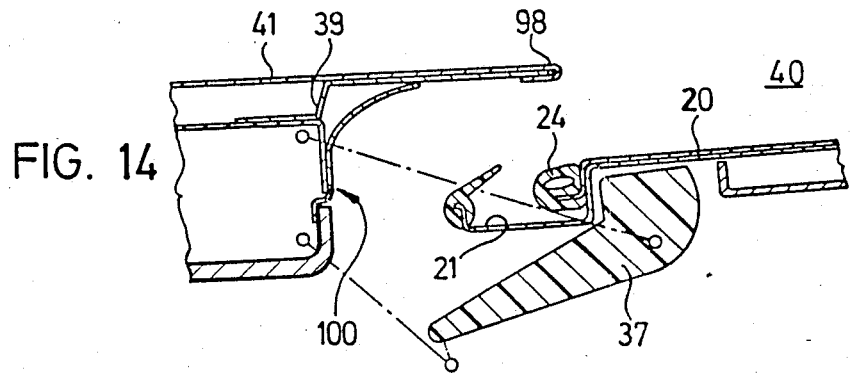
FIGS. 14 through 17 are enlarged views in longitudinal cross section of the forward roof area at different operative positions of the cover and an adjustable front shield.
Figure 15:
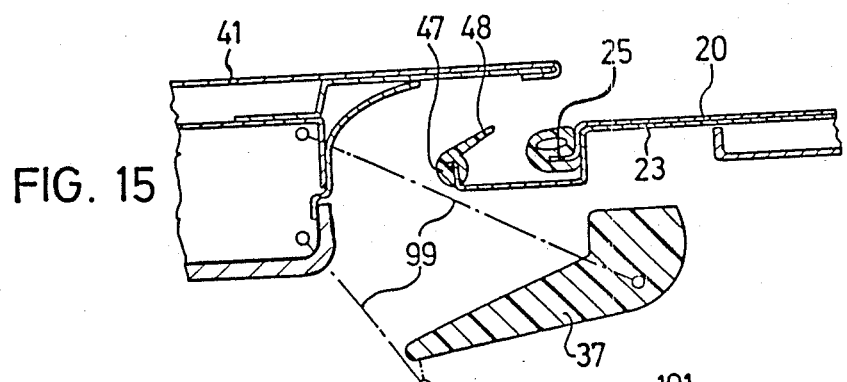

According to the perspective representations of FIGS. 1 and 2, a one-cover ventilator-sliding roof is illustrated having a single cover 20 with a projecting, fixed drip molding 21 extending completely around the cover 20, wherein the drip molding 21 is perforated on the sides in the way indicated at 22. In the case of a sheet metal cover, the drip molding 21 can be formed from an inside cover metal sheet 23 (see FIGS. 12 and 15). The cover 20, as also shown in FIG. 12, is further provided with a seal 24 extending around it which, in the embodiment shown, is slid onto a downwardly offset edge flange 25 of the cover 20. A cover adjustment mechanism 26 that includes a connecting member 27 is connected at each side of the cover 20. Connecting members 27 are slidably guided along guide rails 28 that are fixed with the roof. To displace the connecting members 27 with respect to the rails 28, a drive cable 29 is used. Both of the guide rails 28 are connected to each other in their front area by a cross-strut 30. Cross-strut 30 can carry a drive motor 32 at a central portion, as diagrammatically indicated in FIGS. 3 to 6. A pinion gear can be conventionally driven by drive motor 32, with the pinion gear operatively mounted to the cross-strut 30 by thrust bearings, and the pinion being designed to engage drive cables 29, which are preferably externally threaded cables. At the rear end of the guide rails 28, they are connected to each other by another cross-strut 33, which carries hinges 34 for a pivotable, rigid roof headliner 35. As above, the terms "front" and "rear" refer here to the forward direction of travel of a motor vehicle incorporating the roof of the present invention.

The ventilator-sliding roof, according to FIG. 2, is also provided with two lateral shields 36 (only one of which is represented in FIG. 2), a reinforcement rail 38, an angle stiffener 39 and a front shield 37.

As clearly illustrated in FIG. 3, the cover 20 can be used to close a roof opening 40 that is made in the fixed roof skin 41. Via cover adjustment mechanism 26, cover 20 can swing around a pivot axis (imaginary) at or near its rear edge 42, from the closed position of FIG. 3 to a ventilation position according to FIGS. 1 and 4. In the ventilation position, the front edge 43 of cover 20 is below the surface of fixed roof skin 41, while the rear edge 42 of cover 20 is kept, at least approximately, at the height of the fixed roof skin. When, during vehicle travel, a partial vacuum is created on the outside of roof skin 41 relative to the pressure prevailing in the vehicle interior, an air current develops, as indicated in FIG. 4 at 44. The vehicle interior is thus ventilated through a gap 45 between the cover front edge 43 and the fixed roof skin 41.

Roof opening 40, made in a front portion of fixed roof skin 41, can be at least partially opened in that cover 20 can be lowered from the ventilation position according to FIG. 4, at its rear edge 42, to a position under the surface of fixed roof shell 41. The rear edge 42 is lowered by an amount that is smaller than the amount that the cover front edge 43 is lowered to the ventilation position (compare FIG. 4 and 5). In this way, the cover front edge 43, previously lowered into the ventilation position, is simultaneously raised up to an intermediate position, between the ventilation position of FIG. 4 and the closed position of FIG. 3. Thus, the cover 20 is brought into a sliding position in which it lies essentially parallel to the fixed roof skin 41, as seen in FIG. 5. Thereafter, and as shown in FIG. 6, cover 20 can be pushed rearward into an open position that at least partially opens the roof opening 40.

Figure 17:
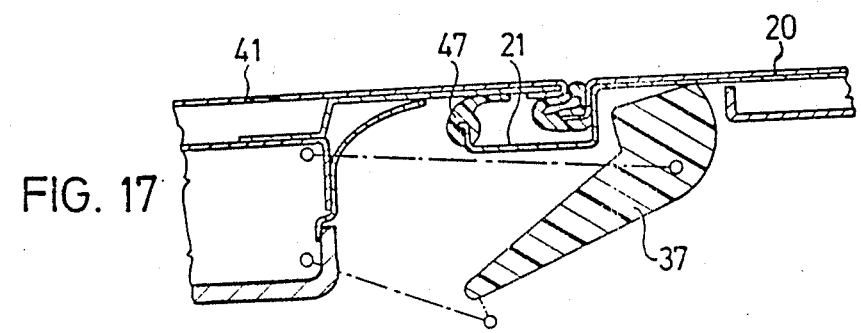

As apparent from FIG. 3, the fixed drip molding 21 surrounding cover 20 engages, in the closed cover position, under an edge gap 46 formed between the perimetric edge of the cover and the edge of the fixed roof skin that defines roof opening 40. Moreover, in the closed cover position, the seal 24 is pressed upward against the fixed roof skin 41 in the edge area of roof opening 40. In this way, a seal 47 (see FIG. 5) placed on the outside edge of the drip molding 21 having an elastically yielding flap 48 will additionally abut the underside of roof shell 41 (see also FIG. 17).

As is further apparent from FIGS. 3 to 6, a rigid headliner panel 35 lies under the portion of the fixed roof skin 41 that borders roof opening 40 at the rear side. The rigid headliner panel 35 carries, on its front end 49, a crosswise extending sliding surface 50 on which there is fastened, on both sides, downwardly-projecting spring legs 51 (see FIG. 2). Spring legs 51 are braced on a part fixed to the roof (not shown) to elastically pretension the rigid headliner panel 35 in an upward direction in the area of its front end 49. In this way, the front end 49 of rigid headliner panel 35 is pressed against the rear end of cover 20 or against the part of the drip molding 21 projecting rearward from this end, such as whenever the cover 20 is in the closed position (FIG. 3) or in the ventilation position (FIG. 4). When cover rear edge 42 is lowered into the sliding position according to FIG. 5, the front end 49 of headliner panel 35 is pressed downward from the cover 20 and is thereby pivoted around hinges 34 at the area of its rear end 52. In this way, a space 53 is defined between the rear portion of roof shell 41 and rigid headliner panel 35 into which cover 20 can be pushed (FIG. 6).

Figure 7:
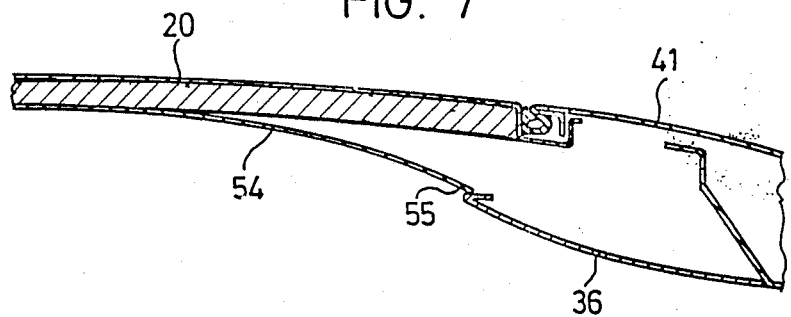
FIGS. 7 and 8 are cross-sectional views taken along line VI—VI of FIG. 3 for one side of the roof.
Figure 8:
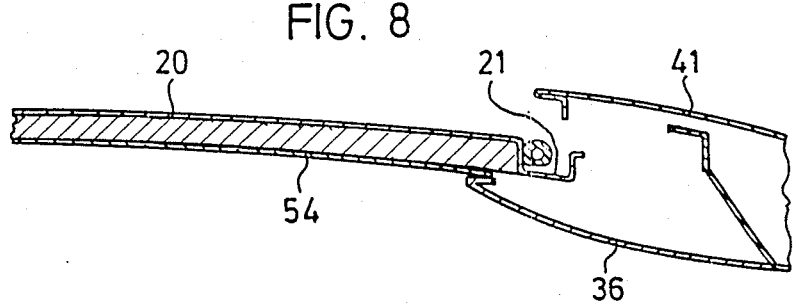

On the underside of cover 20 and as shown in FIGS. 7, 8 and 12, an inside cover lining 54 is provided that is solidly connected to the cover 20 in its transverse central area. The inside cover lining 54 is resilient and is separated from the cover at its lateral sides with its side edges 55 resiliently pressed against the lateral shields 36.

The construction of the cover adjustment mechanism 26 on one side of the roof is represented in detail in FIGS. 9 to 12. The cover adjustment mechanism on the other side of the roof is made as the mirror image of the illustrated side. Guide rail 28, which is preferably an extruded section, is connected under a part of fixed roof skin 41 that is laterally offset toward the side of roof opening 40. Guide rail 28 is fastened in a height adjustable manner, i.e., by conventional means not shown in more detail, to a join plate 57 connected to a roof strut 56.

Connecting member 27 carries, on its side facing guide rail 28, a front roller cage 58 and a rear roller cage 59 for guide rollers 60 and 61 that are rotatably mounted relative to connecting member 27. The guide rollers 60 and 61 are guided within a guide channel 62 of guide rail 28, that runs in the vehicle longitudinal direction that is bordered by an upper flange 63 and a lower flange 64, and which opens toward connecting member 27.

Figure 13:
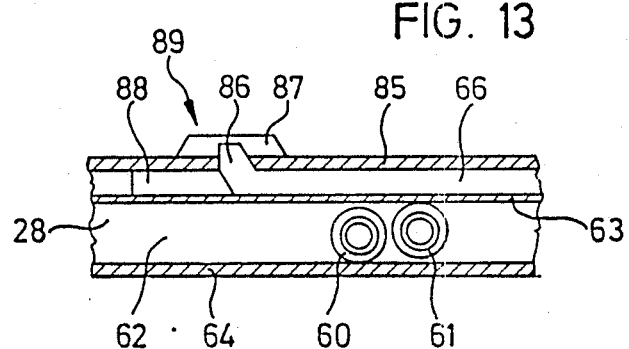
FIG. 13 is an enlarged view of a longitudinal cross section in the area of a stop mechanism utilized in the present invention.

As shown in FIG. 13, guide rollers 60 ride against lower flange 64, while guide rollers 61 ride against upper flange 63. Running parallel to the guide channel 62 in guide rail 28 are a cable duct 65 and a track 66 for a stopping element 67 of a stopping device 68, which is explained in greater detail below. One of the two drive cables 29 is slidably guided lengthwise in the cable duct 65 on each side of the roof. Each drive cable 29 is axially fixed to at least one of the two roller cages 58, 59 to move connecting member 27 along guide rail 28.

Cover 20 is connected to the connecting member 27, on each side, by front and rear cover connecting bolts 69 and 70. The cover connecting bolts 69 and 70 project laterally outward from the outside of the drip molding 21 and are slidably engaged in a front connecting member track 71 and a rear connecting member track 72 of connecting member 27, respectively. Front connecting member track 71 includes a plurality of relatively short segments 73, 74, and 75 that run parallel to the guide channel 62. Segments 73 and 74 are connected by a segment 76 that rearwardly descends, while between segments 74 and 75 there extends a rearwardly rising segment 77. Rear connecting member track 72 comprises segments 78, 79 and 80 that also run parallel to the guide channel 62. Between segments 78 and 79 there is a segment 81 that rises in a rearward direction, while segments 79 and 80 are connected by a segment 82, which also rises rearwardly but whose degree of incline is smaller than that of segment 81.

By sliding each connecting member 27 relative to the cover 20, the rear edge 42 and the front edge 43 of the cover are forced into the desired height adjustment relative tot he fixed roof skin 41. In the embodiment of FIGS. 9, 10 and 11, connecting member tracks 71 and 72 are made so that, when the connecting members 27 are pushed rearward from the closed cover position shown in FIG. 9, the cover 20 is initially brought into the ventilation position (FIG. 10). Subsequently, a further rearward movement of the connecting members 27 causes the rear edge 42 to be lowered while the front edge 43 is raised slightly. Further movement of connecting members 27 causes the cover 20 to be carried along with the connecting members 27 by the latter to a position under fixed roof skin 41.

A stopping device 68 is provided to prevent the cover 20, during the above-described pivoting and height-adjustment movements, from sliding relative to fixed roof skin 41. That is, stopping device 68 releases the cover 20 to slide rearwardly only after the cover rear edge 42, as in FIG. 11, is lowered into the position necessary for the cover to slide. The stopping device 68 comprises, for this purpose, a blocking lever 83 connected under the cover 20 to swing about a joint 84 which is fixed to the cover 20. The blocking lever 83 swings around an axis arranged parallel to the roof surface and carries a stopping element 67 on its forward facing free end. A further feature of the stopping device is detailed in FIG. 13, wherein a flange 85 of the guide rail 28 that borders track 66 from above has a stopping notch 86 therethrough which is also covered by a stopping part 87 provided on guide rail 28. Further provided in front of stopping notch 86 within track 66 is another stopping part 88. The stopping parts 87 and 88, along with stopping notch 86, form a stop, fixed with the roof by way of guide rail 28, which is designated by 89, as a whole. The stopping element 67 is kept in engagement with the stop 89 by a cam surface 90 (see FIG. 9) on the upper side of connecting member 27 while the cover is moved between the closed position and the ventilation position, and up to just before reaching the cover position represented in FIG. 11.

In the closed cover position of FIG. 9, the connecting member 27 is in its forward-most position. Cover connecting bolts 69 and 70 are in rear upper segments 75 and 80, respectively, of connecting member tracks 71 and 72. The cover 20 is pressed with its encircling seal 24, from below, against the edge of the roof opening 40. If, by drive cable 29, the connecting members 27 on both sides of the roof are pushed rearward, then the cover 20 will be prevented from making a sliding movement by the stopping element 67 engaged with stop 89 by force of the cam surface 90. As a result, a longitudinal relative movement occurs between the connecting members 27 and the cover 20, during which cover connecting bolts 69 and 70 enter inclined segments 77 and 82, respectively, of connecting member tracks 71 and 72, respectively. By the interaction of the front connecting bolt 69, fixed to the cover 20, and the connecting member track segment 77, the cover front edge 43 is pulled downwardly and is lowered under the front edge of roof opening 40. Simultaneously, by a compensating lowering of the rear roof connecting bolt 70 in the connecting member track segment 82, the cover rear edge 42 is kept at the roof height. The ventilation gap 45 between the front edge of roof opening 40 and the cover front edge 43 is made to then achieve its maximum value when the connecting member 27, shown in FIG. 10, is pushed back far enough that the cover connecting bolts 69 and 70 are in segments 74 and 79, respectively, which run essentially horizontally within the connecting member tracks 71 and 72, respectively.

It is understood that the connecting members 27, in order to adjust the size of the ventilation gap 45, can be stopped in any intermediate position between the closed position of FIG. 9 and the ventilation position of FIG. 10. A further rearward shifting of the connecting member 27 causes the cover connecting bolts 69 and 70 to enter segments 76 and 81, respectively, which are inclined in the opposite direction within connecting member tracks 71 and 72, respectively. The front edge 43 of the cover 20, by interaction of the front connecting bolt 69 and the connecting member track segment 76, is raised to an intermediate position between the ventilation position and the closed position, while simultaneously, by interaction of the rear connecting bolt 70 and the connecting member track segment 81, the cover rear edge 42 is lowered. In this way, cam surface 90 of the connecting member 27 continues to hold stopping element 67 in engagement with stop 89, which is fixed with the roof. Then, with a further rearward pushing of the connecting member 27, the cover connecting bolts 69 and 70 reach front segments 73 and 78, respectively, of connecting member tracks 71 and 72, respectively, while a recess 91 on the cam surface 90 releases the stopping element 67. The stopping element 67, by pivoting the blocking lever 83 around joint 84, enters downwardly into the track 66 of guide rail 28 by stopping segment 86. By striking the front ends of connecting member tracks 71 and 72 on the cover connecting bolts 69 and 70, respectively, the cover 20, now essentially parallel to the roof surface and guide channel 62, can be rearwardly carried along by the connecting member 27 and slid under the part of fixed roof skin 41 that is rearwardly adjacent to the roof opening 40 (see FIG. 6).

In reverse operation, starting from the open position of FIG. 6, the connecting member 27 is pulled forward along the associated guide rail 28, and an engagement between the stopping element 67 and the track 66 prevents an undesired pivoting of cover 20. The cover 20 is carried forward by the connecting member 27 until the cover 20 is under the roof opening 40. At this point, stop element 67 hits the inclined end of stopping part 88 and a cam bevel 92 on the connecting member 27, that borders cam surface 90 in the front, pushes the stop element 67 upwardly through the stop opening 86 and into engagement with stop 89. The cover 20 is thus prevented from sliding relative to the fixed roof while the connecting member 27 is released for relative sliding movement with respect to cover 20. If the connecting member 27, now starting from the position of FIG. 11, moves further forward, the adjustment operations, described above, occur in reverse order and direction until the cover 20 finally reaches the closed position of FIG. 9.

The lateral shield 36, that covers the cover adjustment mechanism 26 from below and as apparent in FIG. 12, is releasably connected to guide rail 28 by resilient hooks 93 and 94. The lateral shield further forms a drip molding 95 that extends under the side edges of the roof opening 40 to accept the water caught by drop molding 21 of cover 20 and drain it by water drains 96 at either end (FIG. 2). An inside edge 97 of the lateral shield 36 is in sliding engagement with side edge 55 of the resilient inside cover lining 54.

Front shield 37, represented in FIGS. 14–17, is movably mounted in the area of front edge 98 of the roof opening 40 and is connected, for example, by a four-bar mechanism 99, shown as chain lines, to a member fixed to the roof, preferably to cross-strut 33, and is biased for upward movement in a conventional manner not shown in more detail. For example, a torsion spring could bias one or more of the links of mechanism 99 shown in chain line to provide an upward elastic pretensioning. Preferably, the front shield 37 is a reinforced soft material part, for example, a sheet steel reinforced, polyurethane foam part. Front shield 37 engages under the front end of cover 20 when the latter is in a position aligned with the roof opening 40, e.g., the ventilation position according to FIG. 14 or the closed position according to FIG. 17.

Figure 16:
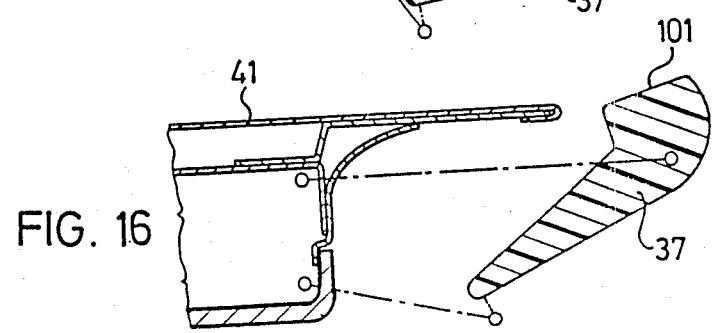

In this way, the front shield 37 results in a harmonic transition between the flat cover 20 and a relatively high bracket part 100 of the cross-strut 30. Moreover, the front shield 37 provides an impact protection that covers front edge 98 of roof opening 40 when cover 20 is pushed back (FIG. 16). In the position where the front shield 37 is swung fully up, an end surface 101 of the shield projects obliquely rearwardly above the roof surface to act as a wind deflector (FIG. 16). The front shield adjustment can be performed with the aid of cams on cover 20 or the connecting member 27, such as has been known to do with conventional wind deflectors; see, for example, U.S. Pat. No. 4,630,859.

Figure 18:
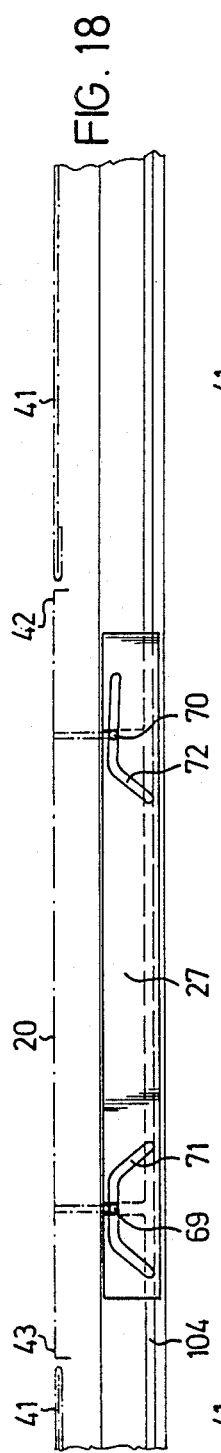
FIGS. 18 through 22 are diagrammatic longitudinal cross sections through a ventilator roof according to a modified embodiment in accordance with the present invention.
Figure 19:
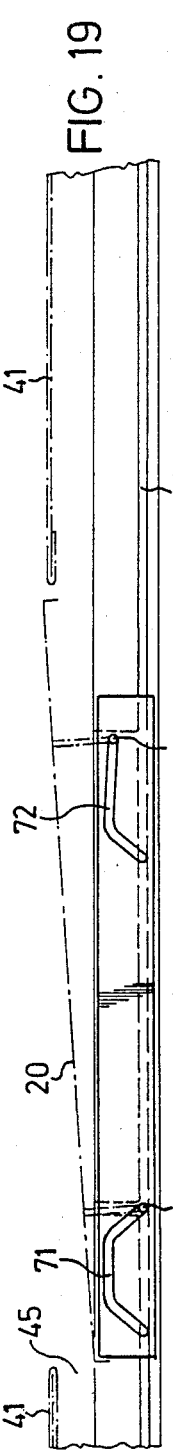
Figure 20:
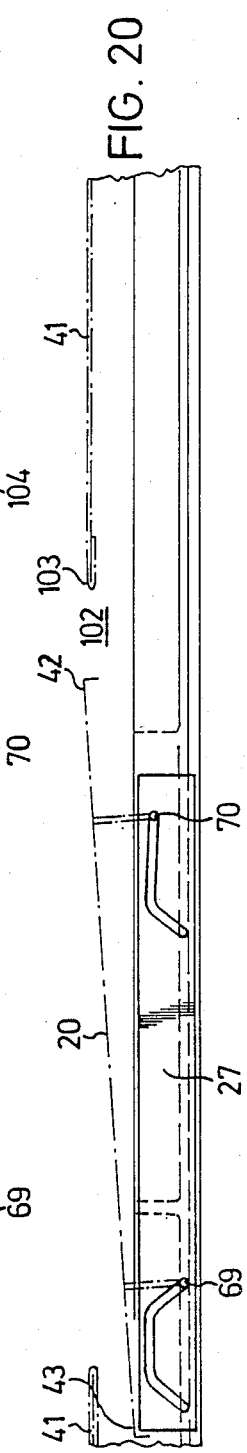
Figure 21:
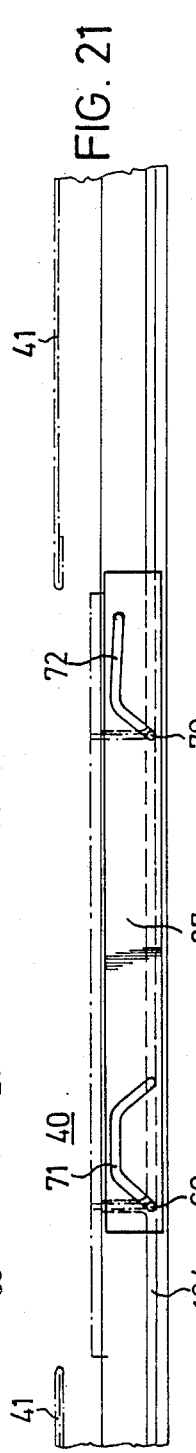

FIGS. 18 to 22 diagrammatically show a modified embodiment of the single cover ventilating-sliding roof of the present invention in various operative positions. In this embodiment, connecting member tracks 71 and 72 of connecting member 27 are made so that the cover 20, with a forward movement of connecting member 27 from the closed cover position (FIG. 18), is first lowered at its front edge 43 (FIG. 19). Through the gap 45 between the front edge of the roof opening 40 and the front edge 43 of cover 20, the vehicle interior can be ventilated. By driving the connecting member 27 further forward along the guide rail 28, cover 20, which is swung downward at its front edge 43, is carried forward by the rear ends of connecting member tracks 71 and 72, abutting the cover connecting bolts 69 and 70, respectively, and cover 20 is pushed with its front end 43 under the part of fixed roof shell 41 in front of roof opening 40. In this way, a ventilation gap 102 is defined between the rear edge 42 of cover 20, that is kept at roof height, and the rear edge 103 of roof opening 40 (FIG. 20).

Figure 22:
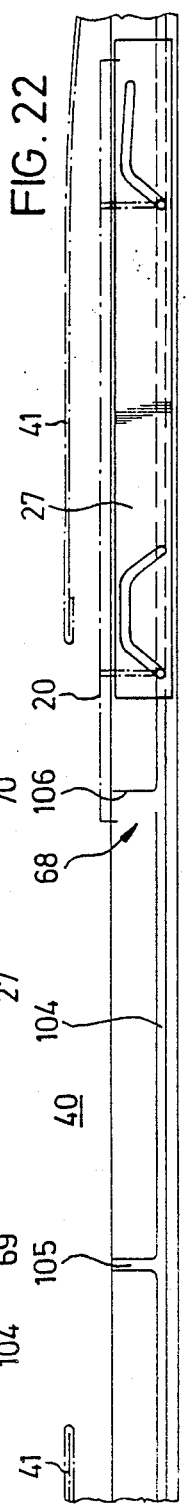

When pushing the connecting member 27 rearward from the position of FIG. 18, cover 20 is lowered into a position essentially parallel to the fixed roof surface (FIG. 21) and is then carried rearward by connecting member 27 under the part of fixed roof skin 41 that is rearwardly adjacent the roof opening 40 (FIG. 22).

With this embodiment, the stopping device, again, designated overall as 68, is made of a track 104 that is fixed with the roof and interacts directly with cover connecting bolts 69 and 70. The track 104 can, preferably, be part of guide rail 28. In the closed position (FIG. 18), the cover connecting bolts 69 and 70 have upwardly exited track 104 and lie against stops 105 and 106, respectively, thus preventing the sliding of cover 20. If the cover front edge 43 is lowered, the cover connecting bolt 69 creeps downward along stop 105 until it enters the track 104 in the cover ventilation position. In this way, the cover is the released for sliding movement in a forward direction. A rearward sliding of the cover 20 is prevented in this position by the cover connecting bolt 70 abutting the rear stop 106. If cover 20, in contrast, is lowered into the intermediate position according to FIG. 21, both bolts 69 and 70 come free from associated stops 105 and 106. Both bolts 69 and 70 enter the track 104 and to then release the cover 20 for rearward sliding.

It is understood that numerous modifications are possible in the framework of the invention numerous modifications are possible. Thus, instead of a seal 24 extending around the cover 20, only a projecting sealing surface may be provided which, in the closed cover position, is pressed from below against a seal provided on the underside of the edge of roof opening 40. If headroom does not play a decisive role, instead of a rigid headliner panel 35 that can be lowered in front for insertion of the cover 20, a rigidly mounted fixed roof headliner can be provided that is suitably connected to the cross-strut 33 and/or guide rails 28. Such a rigidly mounted headliner can optionally also replace the cross-strut 33. Optionally, to maximize headroom, the utilization of a headliner panel beneath the pushed-back cover 20 can be completely dispensed with.

A further modified embodiment of the single-cover ventilator-sliding roof is shown in FIGS. 23 to 27. In this case, the cover 20 is made of transparent or translucent material and is braced on a surrounding cover carrier 110. On a projecting outside edge of the cover carrier 110, a profiled elastomeric member 111 is provided surrounding the cover 20. The profiled member 111 is formed with a hollow chamber seal portion 24′, an elastic flap 48′ for engaging against the underside of roof skin 41 in the closed cover position, and a drip molding portion 21′ disposed between the flap 48′ and the seal portion 24′. By way of the cover 20, the roof opening 40 made in the front part of fixed roof skin 41 can be selectively closed or opened at least partially.

Beneath the fixed roof skin 41, a roof frame 112 is fastened in which an opening 113 is made. The opening 113 lies beneath the roof opening 40. The longitudinal dimension of the opening 113 is smaller than the longitudinal dimension of the roof opening 40, and a front edge 114 of roof frame 112 defining opening 113 projects rearward of the front edge 98 defining roof opening 40. The front portion of roof frame 112 is covered, from below, by a fixed headlining element 115. The roof headlining element 115 extends rearwardly underneath the front part of cover 20 in the closed position. In this way, headlining element 115 is also disposed under a wind deflector 117, which is provided in the area of the front edge 98 of roof opening 40 and can be swung, in response to the cover sliding movement, between a rest position shown in solid lines in FIG. 27 and a work position indicated with dashed lines. The adjustment mechanism of wind deflector 117 is not represented. However, for example, it can be constructed, similar to that of front shield 37, as described above, in the manner known for conventional wind deflectors.

The roof frame 112 and headlining element 115 are each provided with a break or opening in the area forward of the front edge 98 of the roof opening 40 and also forward of the wind deflector 117. These openings are preferably elongated to run parallel to the roof frame edge 114, are arranged flush with each other and have a ventilation grille 118 set lengthwise therein. The ventilation grille 118 forms three groups of ducts, in the illustrated embodiment (see especially FIG. 23), arranged consecutively next to each other in the vehicle transverse direction. Each group of ducts is comprised of four parallel ventilation ducts 119, each of which is essentially vertically oriented.

Figure 23:
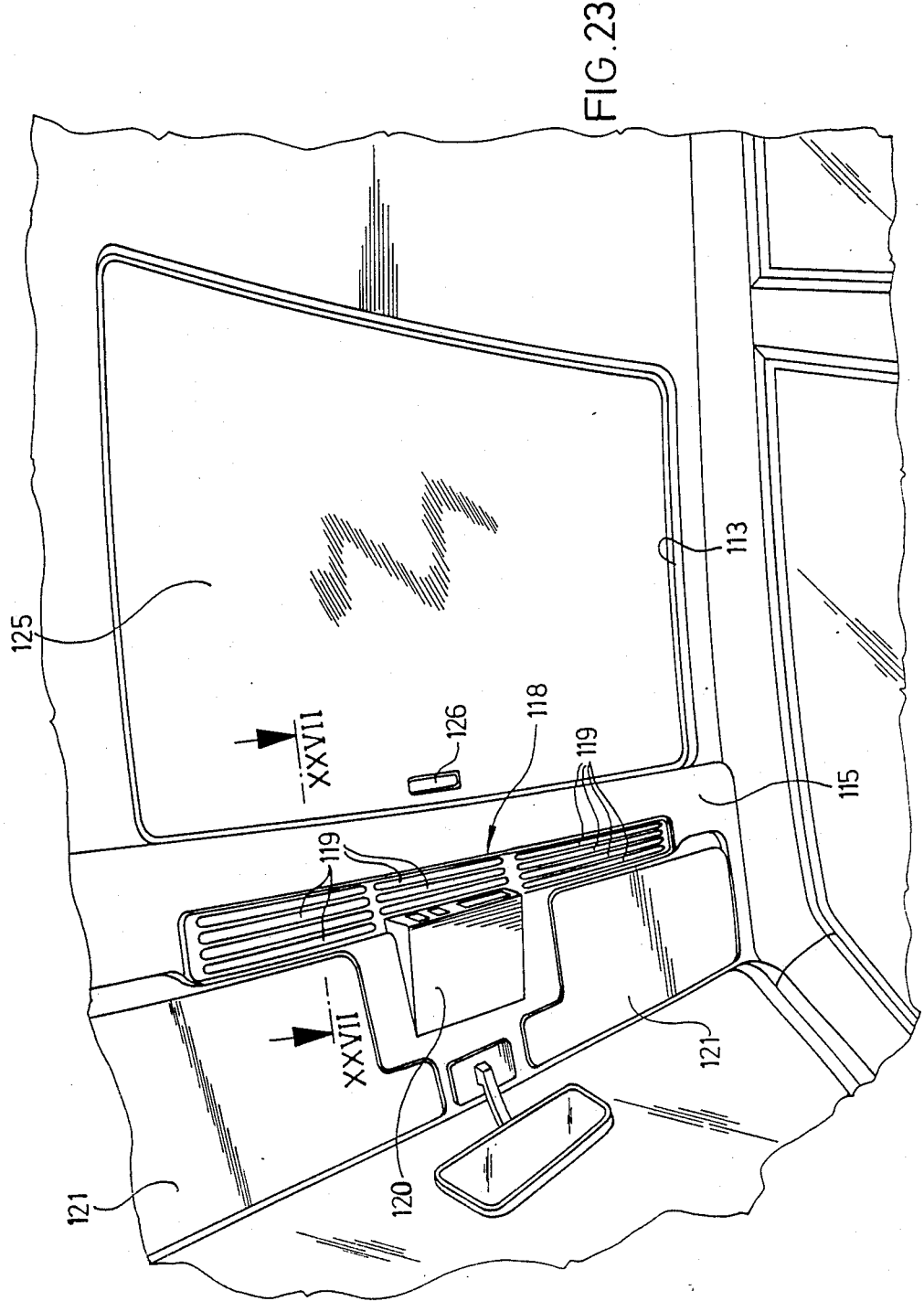
FIG. 23 is a partial inside view, in perspective, of a motor vehicle that is equipped with a further modified embodiment of the ventilator roof in accordance with the present invention.

As shown in FIG. 23, the ventilation grille 118 extends over almost the entire width of the roof frame opening 113. In this way, the ventilation grille 118 can be connected to a bracket 120 fixed under the headlining element 115 that receives, for example, an interior light and/or a reading lamp or the like. The ventilation grille 118 and bracket 120 can be constructed as a single piece. Bracket 120 abuts the roof underside in a position between the usual hinged sun visors 121, and the ventilation grille 118 is located behind the swung-up position of the sum visors 121, so that visors 121 do not impede the access of air to the ventilation ducts 119.

Figure 27:
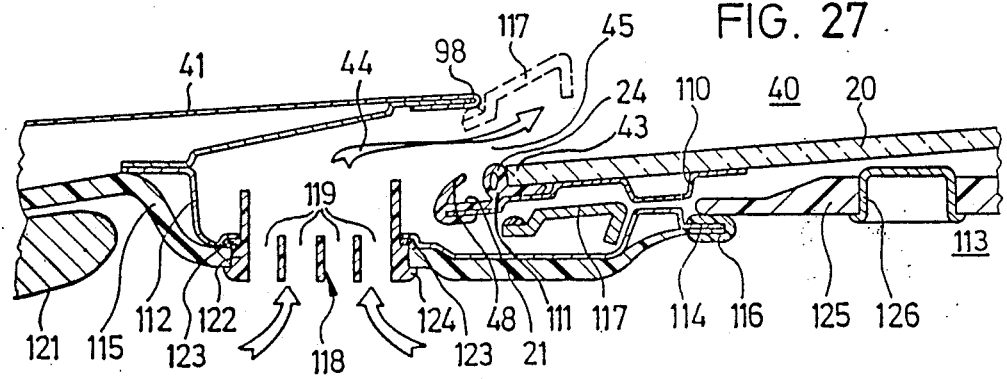
FIG. 27 is an enlarged view of a cross section taken along line XXVII—XXVII of FIG. 23.

The top side of a flange 122 that projects all around ventilation grille 118 is, as indicated at 123 in FIG. 27, glued to the underside of roof frame 112. A lug 124 of the ventilation grille 118 extends outward from the flange 122 to abut the underside of the edge of the headlining element 115 which defines the opening that receives the ventilation grille 118. In this way, the clearance gap between the ventilation grille and the headlining element 115 is covered, and the headlining element 115 is maintained in engagement with the roof frame 112.

A sliding roof headliner 125 is provided which, near its front end, exhibits a recessed grip 126. The sliding headliner 125, starting from a closed position in which it covers frame opening 113, can be slid rearward over a rear portion of the roof frame 112 into an open position in which it at least partially opens opening 113.

The operation of this embodiment is described starting from the closed position shown in FIG. 24. The cover 20 can, by way of an adjustment mechanism constructed in accordance with the embodiment described in detail above, pivot around an (imaginary) pivoting axis at or near its rear edge 42. In this way, cover 20 can be brought into the ventilation position of FIGS. 1, 25 and 27, wherein the cover front edge 43 lies under the surface of the fixed roof skin 41, while the cover rear edge 42 is kept approximately at roof height. Thus, during the travel of the vehicle, a partial vacuum may arise on the outside side of roof shell 41 relative to the pressure prevailing in the vehicle interior, whereby an air current indicated in FIGS. 25 and 27 at 44 develops. The vehicle interior can then be intentionally and effectively ventilated by the air ducts 119 and gap 45 between the cover front edge and the fixed roof skin. Moreover, a shifting of the cover 20 between the closed position (FIG. 24) and the ventilation position (FIG. 25) is not visible from the vehicle interior.

The roof opening 40 can, if desired, be at least partially opened by moving the cover 20 from the ventilation position of FIG. 24 by lowering its rear edge 42 under the surface of fixed roof shell 41 and then driving the cover 20 rearwardly into the space 53, between roof skin 41 and cover frame 112. Furthermore, in a way known in the art and not represented in more detail, preferably the cover 20, when driven back, moves the sliding roof headliner 125 rearward along with it. For example, abutment surfaces could be provided on each element to act in the rearward direction; see U.S. Pat. No. 4,320,921, for example. Sliding roof headliner 125 is also received in space 53 (FIG. 26). But, if desired, the sliding roof headliner 125 can be pushed rearward by the recessed grip 126, independently of cover 20, even when the cover 20 is in the closed position. When the cover 20 is moved rearward, the wind deflector 117 is automatically brought into its work position (FIG. 26).

Figure 28:
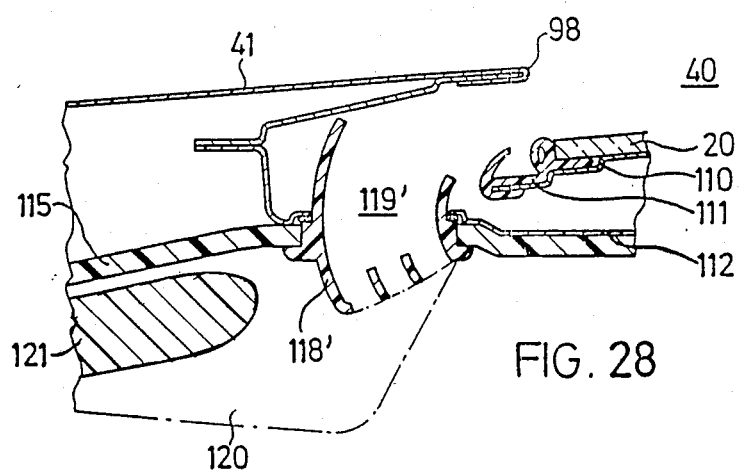
FIGS. 28 and 29 are cross sections according to FIG. 27 for modified embodiments of the ventilator grille.
Figure 29:
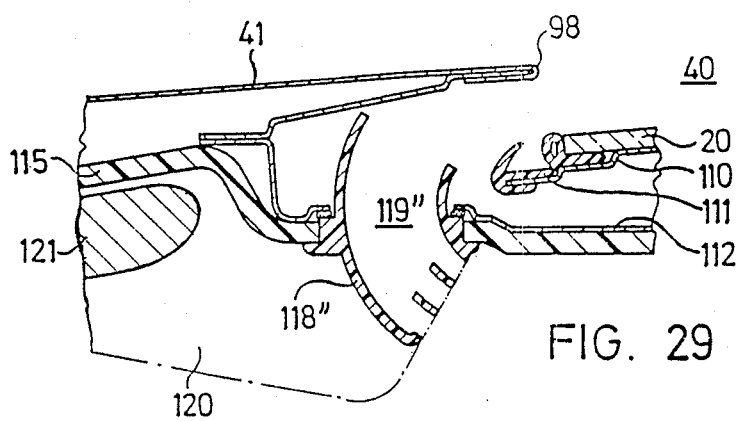

FIGS. 28 and 29 show two modified embodiments for a ventilation grille 118' or 118". Ventilation grilles 118' and 118" each form ventilation ducts 119' or 119" that are forwardly convexly curved. The structure and function of the ventilation roof of FIGS. 28 and 29 correspond to those according to FIGS. 23 to 27.

The drive motor 32, which forms a part of the cover displacement mechanism, is also diagrammatically indicated in FIGS. 24 to 26. It is provided in front of the ventilation grille 118.

While in the described embodiments a single longitudinally extending ventilation grille 118, 118' or 118" is provided, it is understood that two or more separate ventilation grilles can also be present. Furthermore, the one or more ducts 119, 119', advantageously runs parallel to the front edge of the roof opening over a distance that corresponds to at least 75% of the width of the roof opening.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A ventilator roof structure for a motor vehicle having a fixed roof skin with a roof opening therein, a single cover operable to close said roof opening in a closed position, and an adjustment means for swinging said cover from said closed position into a ventilation position in which a front edge of the cover is spaced a distance below the fixed roof skin and a rear edge of the cover is substantially at the same height as the fixed roof skin, and for moving said cover rearward into an open position that at least partially opens said roof opening, wherein said roof opening is provided in a front portion of said fixed roof skin, wherein said cover is pivotable about a pivot axis provided by said adjustment means near a rear edge of said cover for swinging the cover into said ventilation position, and wherein said adjustment means is operable for moving said cover from said ventilation position into said open position by lowering the rear edge of the cover below said fixed roof skin and then sliding said cover rearward under said roof skin.

2. The ventilator roof of claim 1, wherein the adjustment means is operable for raising the front edge of the cover to an intermediate position, between said ventilation position and said closed position, as the rear edge of the cover is lowered, when moving said cover from said ventilation position to said open position.

3. The ventilator roof of claim 2, wherein said cover carries a fixed drip molding projecting outward from all sides of said cover, which in the closed position of the cover, extends under an edge gap defined between an outside edge at said cover and an edge of said roof opening.

4. The ventilator roof of claim 3, wherein said cover includes a seal means for providing a sealing surface extending completely around said cover, said sealing surface having outer circumferential dimensions that are larger than the respective outer circumferential dimensions of said roof opening.

5. The ventilator roof of claim 4, wherein said seal means is located for causing the sealing surface to be pressed vertically against the edge of said roof opening, from below, in the closed position of the cover.

6. The ventilator roof of claim 2, including a rigid headlining panel lowerably connected below said fixed roof skin rearward of said opening.

7. The ventilator roof of claim 6, wherein said rigid headlining panel has a rear end that is pivotally connected to a member that is fixed to the fixed roof skin and wherein resilient means for elastically pretensioning the rigid headlining panel in an upward direction is provided between said fixed roof skin and a front end of said rigid headlining panel, said resilient means resiliently urging said rigid headlining panel against said cover, from below, in all positions of the cover.

8. The ventilator roof of claim 7, wherein said adjustment means comprises a cover adjustment mechanism provided on each side of said roof opening below said fixed roof skin.

9. The ventilator roof of claim 8, wherein said cover adjustment mechanism on each side of the roof opening includes a connecting member that is slidably guided in the vehicle longitudinal direction along a guide rail attached to the fixed roof skin and that is connected to said cover on each side by at least one front and one rear cover connecting bolt of said cover that engage in connecting member tracks of said connecting member.

10. The ventilator roof of claim 9, wherein a forward end of each guide rail is connected to the other guide rail by a cross-strut.

11. The ventilator roof of claim 10, wherein each guide rail, at its rear end, is connected to the other guide rail by a cross-strut to which the lowerable rigid headlining panel is pivotally connected.

12. The ventilator roof of claim 11, wherein each connecting member is connected by a drive cable to a common drive means.

13. The ventilator roof of claim 12, wherein rotatably mounted guide rollers are connected to each connecting member that are guided in a guide channel or a respective guide rail running in the longitudinal vehicle direction.

14. The ventilator roof of claim 9, wherein said connecting member tracks form means for causing, with a sliding back of each connecting member from the closed cover position, said cover to be brought into said ventilation position and then to be lowered at its rear edge and carried rearward with each connecting member.

15. The ventilator roof of claim 1, further comprising means for sliding said cover forward from said ventilation position, in which its front end is lower than said fixed roof skin, under a portion of the fixed roof skin located in front of said roof opening.

16. The ventilator roof of claim 9, wherein said connecting member tracks form means for causing said cover, with a forward sliding of each connecting member from said closed cover position, to be first lowered at the cover front edge and then carried along forward, and with a rearward sliding of the connecting members from the closed cover position, causing said cover to be lowered at the cover front edge and rear edge and then carried along rearward.

17. The ventilator roof of claim 9, further including a stopping means for preventing said cover from sliding during swinging into said ventilation position, said stopping means releasing said cover for rearward sliding when the cover rear edge is lowered for sliding to said open position.

18. The ventilator roof of claim 17, wherein said stopping means comprises at least one blocking lever with a stopping element, said blocking lever being pivoted to a side of said cover and a cam surface means, on the connecting member at the same side of the cover as said blocking lever, for keeping the stopping element in engagement with a stop that is fixed with respect to the fixed roof skin until the rear edge of the cover is lowered for rearward sliding to said open position.

19. The ventilator roof of claim 18, wherein each guide rail is provided with a track for said stopping element that extends lengthwise along the guide rail, and wherein said cam surface means on the connecting member releases said stopping element from said stop and permits said stopping element to go into said track when the cover rear edge is lowered for rearward sliding to said open position.

20. The ventilator roof of claim 9, wherein a lateral shield is provided to cover, from below, the cover adjustment mechanism on each side of said roof opening.

21. The ventilator roof of claim 20, wherein each lateral shield simultaneously forms an additional drip molding, which engages under lateral parts of a drip molding that extends around said cover, said additional drip molding being provided with water drains.

22. The ventilator roof of claim 20, wherein each lateral shield is clipped to one of said guide rails.

23. The ventilator roof of claim 20, wherein, on the underside of said cover, an elastic inside cover lining is fixedly connected to said cover in a central portion, said inside cover lining having laterally projecting side portions which are elastically pressed against said lateral shields.

24. Ventilator roof of claim 20, wherein an inside edge of each lateral shield is elastically engaged with an underside surface of said inside cover lining.

25. The ventilator roof of claim 2, wherein, in the area of the front edge of said roof opening, there is provided a movably mounted front shield that engages under the front end of said cover when said cover is in said closed and ventilation positions.

26. The ventilator roof of claim 25, wherein said front shield moves into a wind deflecting position when said cover is slid rearward.

27. The ventilator roof of claim 26, wherein said front shield is acted upon by means to shift said front shield upward.

28. The ventilator roof of claim 27, wherein said front shield also serves as a means for protecting against impacts by covering a front edge of the roof opening.

29. The ventilator roof of claim 9, wherein each guide rail is made as an extruded section.

30. The ventilator roof of claim 2, wherein a fixed headlining member is provided under the fixed roof skin at least in an area in front of said roof opening and which, in the area of the front edge of said roof opening, extends rearward to under the front edge of the cover in the closed position and is provided with at least one ventilation grille.

31. The ventilator roof of claim 30, wherein, in the area of said front edge of said roof opening, there is provided a wind deflector having means which, in response to sliding movement of the cover, moves the wind deflector between a resting and a working position, and wherein said fixed headlining member also extends under said wind deflector.

32. The ventilator roof of claim 31, wherein said ventilator grille is in a portion of said fixed headlining member that extends under a portion of said fixed roof skin that is located in front of said front edge of said roof opening.

33. The ventilator roof of claim 32, wherein said ventilator grille is placed in front of said wind deflector means.

34. The ventilator roof of claim 33, wherein said ventilator grille includes at least one air duct that runs in an essentially vertical direction.

35. The ventilator roof of claim 33, wherein said ventilator grille includes at least one air duct convexly curved forwardly.

36. The ventilator roof of claim 35, wherein said ventilator grille runs parallel to said front edge of said roof opening over a distance that corresponds to at least 75% of the width of said roof opening.

37. The ventilator roof of claim 2, wherein said cover consists of transparent or translucent material, and wherein a sliding roof headliner is provided underneath said cover in said closed position, said sliding roof headliner covering an inner opening defined in a roof frame under said roof opening, said sliding roof headliner being rearwardly slidable into an open position in which it at least partially opens said inner opening.

* * * * *